Dec. 14, 1965 W. G. COWAN 3,223,248
OVERHEAD TRAVELLING CRANE
Filed July 12, 1963 3 Sheets-Sheet 3

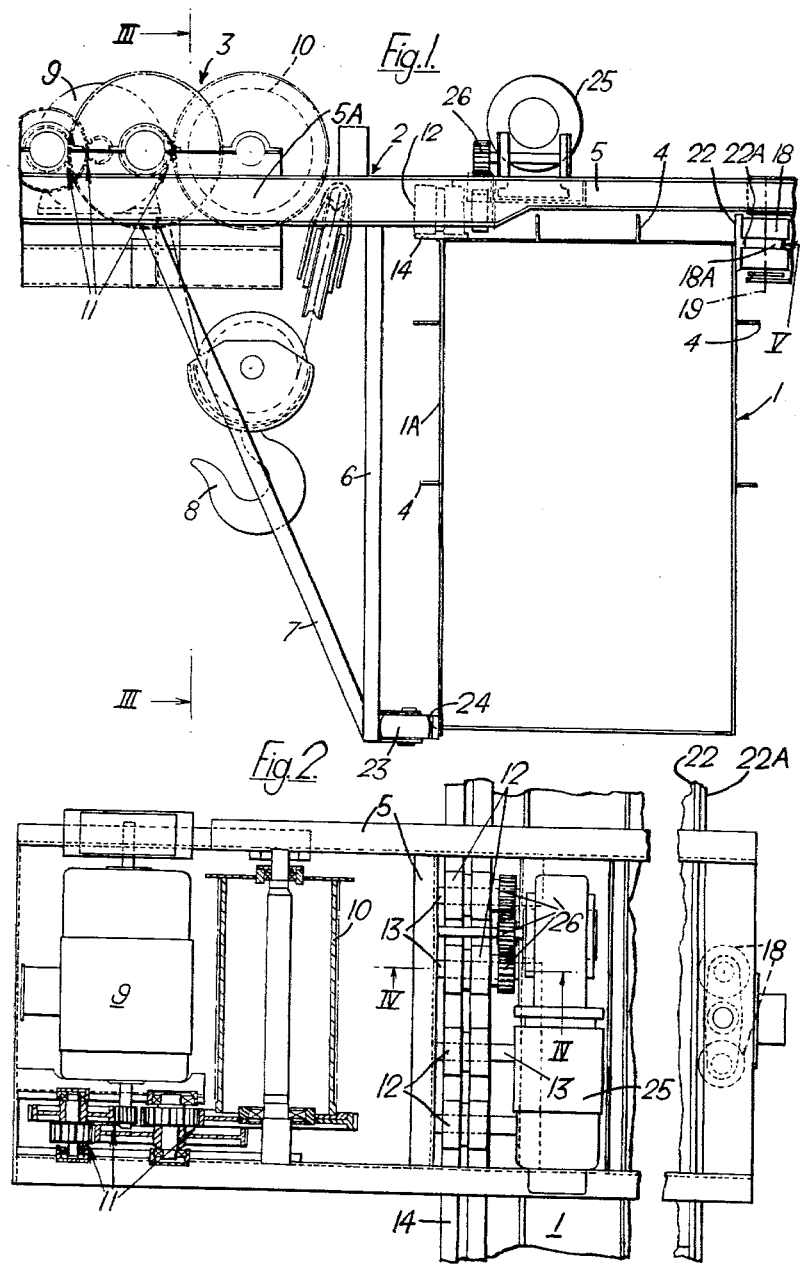

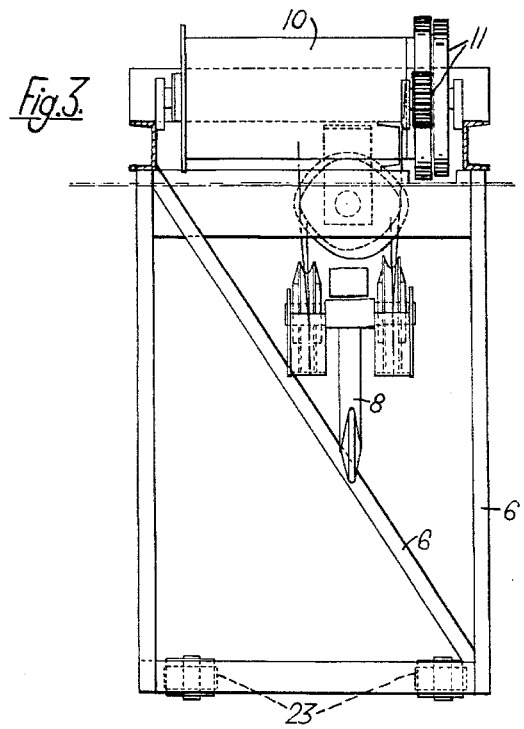
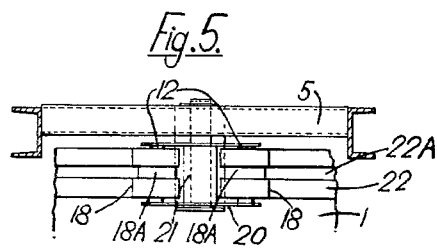

Inventor
WILLIAM GRAHAM COWAN

By Irwin J. Thompson
Attorney

United States Patent Office 3,223,248
Patented Dec. 14, 1965

3,223,248
OVERHEAD TRAVELLING CRANE
William G. Cowan, East Kilbride, Scotland, assignor to J. H. Carruthers & Company Limited, East Kilbride, Scotland, Great Britain, a British company
Filed July 12, 1963, Ser. No. 294,700
Claims priority, application Great Britain, July 12, 1962, 26,790/62
1 Claim. (Cl. 212—17)

This invention relates to an overhead travelling crane, and more particularly to such a crane of the kind comprising a single box-section overhead beam, and trolley means on the beam including a framework adjacent to the top and one side of the beam, wheel assemblies mounted on the framework, tracks on the beam cooperating with the wheel assemblies to enable traversing of the beam by the framework and hoisting gear mounted on the framework so as to overhang said one side of the beam, the wheel assemblies and their tracks consisting of a plurality of longitudinally spaced load-bearing wheel assemblies having upright wheels engaging an upper track on top of the beam at the beam corner adjacent to the hoisting gear so as to load the beam torsionally, a plurality of longitudinally spaced reaction-wheel assemblies located at a lower portion of said side of the beam and having horizontal bottom reaction wheels engaging a lower track on said lower portion, and a plurality of longitudinally spaced reaction-wheel assemblies located at an upper portion of the other side of the beam and having horizontal top reaction wheels engaging an upper track on said upper portion.

The chief object of the present invention is to provide trolley means embodying wheels with resiliently compressible tires which are substantially undistorted by the offset heavy loading.

According to the present invention there is provided an overhead travelling crane of the aforesaid kind wherein each of the load-bearing wheel assemblies and of the upper reaction-wheel assemblies consists of an axle carried by the framework, a cylindrical sleeve rotatably mounted on and slidingly reciprocable along the axle, and resiliently compressible tire means on the sleeve presenting a peripheral groove. The upper tracks for said load-bearing and upper reaction-wheel assemblies have longitudinal ribs engaging in the peripheral grooves presented by the tire means to guide the sleeves along the tracks. Each of the lower reaction-wheel assemblies consists of a lower reaction wheel presenting a transversely convex tread surface, and the lower track presents a flat surface which cooperates with the convex tread surface of the lower reaction wheels to permit vertical sliding movement and lateral rocking movement as well as the usual rolling movement of the lower reaction wheels, whereby the framework is free to move up and down and to tilt laterally about the line of contact of the lower reaction wheels with the lower track and, on tilting, moves the axles of the load-bearing and upper reaction-wheel assemblies substantially horizontally so that distortion of the tire means of said assemblies is minimized.

By virtue of the invention, tire wear is reduced to a minimum and smooth running of the trolley means is assured.

Moreover, the load-bearing wheel assemblies of the trolley means can be a longitudinal train of at least three wheel assemblies, in accordance with the load-lifting capacity of the crane, the resiliently compressible tires providing for simple and effective transfer of load from assembly to assembly where there is a train of three or more assemblies. It is thus possible to mass-produce a simple, standard one-wheel assembly for use in the trolley means of the entire range of cranes, and thereby facilitate the manufacture of the cranes and reduce their cost.

Other objects and advantageous features of the invention will become apparent from the embodiment of the invention now to be described by way of example with reference to the accompanying drawing in which:

FIG. 1 is a transverse section of a single-beam overhead travelling crane showing the trolley mounted on the overhead travelling beam.

FIG. 2 is a top plan view of FIG. 1.

FIG. 3 is a sectional view on the line III—III of FIG. 1.

FIG. 5 is a detail view in the direction of arrow V, FIG. 1.

Figure 4:
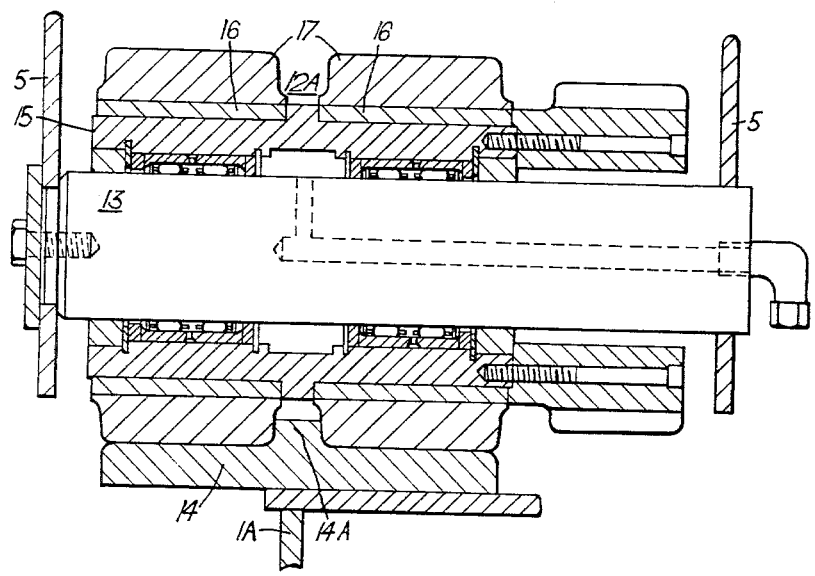
FIG. 4 is a sectional detail view on the line IV—IV of FIG. 2.

Referring to the drawings:

An overhead travelling crane supported on a gantry (not shown) in a building consists of a single box-section overhead beam 1, wheeled carriages (not shown) on the ends of the beam 1 and running on rails along the gantry, and a wheeled trolley 2 carrying hoisting gear 3 and running on longitudinal tracks on the beam to traverse the beam.

The walls and internal transverse diaphragms of the beam 1 are of light-section steel, and the side and top walls of the beam have secured to the exterior thereof spaced parallel longitudinal webs 4 extending throughout the beam length and normal to the walls, said webs forming longitudinal stiffeners for the beam.

The trolley 2 consists of a carrier framework mounted on wheel assemblies. The framework consists of a horizontal rectangular frame 5 extending across the top of the beam 1 to overhang at 5A a side wall 1A of the beam, a vertical rectangular frame 6 adjacent to said side wall 1A, and sloped struts 7 extending between the free lower end of the vertical frame 6 and the overhanging portion 5A of the horizontal frame 5.

The hoisting gear 3 with its hook 8 is mounted on said overhanging frame portion 5A and inclues an electric motor 9 and a winding drum 10 with their axes parallel and disposed lengthwise of the beam 1, and reduction gearing 11 through which the motor 9 drives the drum 10.

The horizontal frame 5 extending over the beam 1 has a train of four longitudinally spaced load-bearing wheel assemblies including upright wheels 12 which are rotatable on parallel horizontal axles 13 fixed to the frame 5, and which run on a wide, flat rail 14 fixed on top of the beam 1 at the beam corner adjacent the side 1A of the beam. The train of load-bearing wheel assemblies 12 extends over almost the entire width of the frame 5, and the wheel assemblies are equispaced from one one another longitudinally of the beam 1. Each wheel 12 is in the form of an axially elongated relatively small-diameter roller and, as shown in FIG. 4, consists of a centre sleeve 15 rotatable on needle bearings on the axle 13 and capable of limiting sliding reciprocation along the axle, a pair of axially spaced rims 16 secured to the sleeve 15, and a pair of thick tires 17 of resiliently compressible material, e.g. the elastomer polyurethane or the material Duthane (Dunlop Rubber Co.), secured to the respective rims 16 and defining a central peripheral groove 12A. The frame 5 carries at the end thereof remote from the hoisting gear 3 a pair of upper reaction-wheel assemblies including a pair of horizontal reaction wheels 18 rotatable on parallel vertical axles 19 mounted at the ends of a bracket 20 centrally mounted on a pivot pin 21 on the frame 5. The reaction wheel assemblies are of similar construction to the load-bearing wheel assemblies, and the wheels 18 thereof run on a wide, flat rail 22 secured to the beam 1 at a top corner thereof and are capable of limiting sliding reciprocation along their axles and have central peripheral grooves 18A. Each rail 14, 22 has a central shallow longitudinal rib 14A, 22A which engages in the central peripheral groove 12A, 18A in each wheel 12, 18 so that the wheels are retained against axial movement while vertical and horizontal reciprocating movements of the axles 19 and 13, respectively, arising from resilient compression of the wheel tires are permitted.

A pair of horizontal reaction wheel assemblies include wheels 23 which are mounted on the lower end of the vertical frame 6 and are spaced longitudinally of the beam 1 and engage a flat longitudinal rail 24 secured to the adjacent lower corner of the beam 1, the wheel treads being of convex (or barrel) section to permit transverse angling (or tilting) and vertical sliding reciprocation of the wheels as well as the usual rolling.

Traversing of the trolley 2 along the beam 1 is effected by an electric motor 25 which is mounted on the horizontal frame 5 and drives an adjacent pair of load-bearing wheels 12 through suitable gearing 26.

In use of the crane, the trolley 2 traverses the beam 1, the overall load being distributed evenly over the four load-bearing wheel assemblies.

The degree of compression of the tires 17 under top load is in the region of 3/16 inch. The trolley framework is free to move up and down and to tilt laterally about the line of contact of the wheels 23 with the track 24, and on tilting under its offset loading moves the axles 13, 19 substantially horizontally so that distortion of the wheel tires by the offset loading is minimized.

Moreover, the simple wheel assembly with its single resiliently tired wheel can readily be produced by the manufacture of multiple quantities which are then usable in the manufacture of the entire range of cranes of the aforesaid type with lifting capacities varying widely, the lengths of the trains of wheel assemblies embodied in the range of cranes increasing with the lifting capacities of the cranes. This rationalization of the crane manufacture results in a worthwhile reduction in the cost of the cranes.

Additional advantages in providing resiliently compressible tires on the wheel assemblies are:

(a) The impact effect of the trolley on the beam is greatly reduced.

(b) The trolley is silent in its traversing of the beam.

(c) Prolonged life is given to those components of the crane normally subject to deterioration due to impact.

(d) The trolley's wheel-to-track adhesion is improved.

I claim:

In an overhead travelling crane comprising a single box-section overhead beam, trolley means on the beam including a framework adjacent to the top and one side of the beam, wheel assemblies mounted on the framework, tracks on the beam cooperating with the wheel assemblies to enable traversing of the beam by the framework, and hoisting gear mounted on the framework so as to overhang said one side of the beam, the wheel assemblies and their tracks consisting of a plurality of longitudinally spaced load-bearing wheel assemblies having upright wheels engaging an upper said track on top of the beam at the beam corner adjacent to the hoisting gear so as to load the beam torsionally, a plurality of longitudinally spaced reaction-wheel assemblies located at a lower portion of said side of the beam and having horizontal bottom reaction wheels engaging a lower said track on said lower portion, and a plurality of longitudinally spaced reaction-wheel assemblies located at an upper portion of the other side of the beam and having horizontal top reaction wheels engaging an upper track on said upper portion; the improvement comprising each of the load-bearing wheel assemblies and of the upper reaction-wheel assemblies comprising an axle carried by the framework, a cylindrical sleeve rotatably mounted on and slidably reciprocable along the axle, and resiliently compressible tire means on the sleeve presenting a peripheral groove intermediate the axial length of the tire means, the upper tracks for said load-bearing and upper reaction-wheel assemblies having longitudinal ribs engaging in the peripheral grooves presented by the tire means to guide the sleeves along the tracks, each of the lower reaction-wheel assemblies comprising a lower reaction wheel presenting a relatively hard transversely convex tread surface, and the lower track presenting a flat surface which cooperates with the convex tread surface of the lower reaction wheels to permit vertical sliding movement and lateral rocking movement as well as the usual rolling movement of the lower reaction wheels whereby the framework is free to move up and down and to tilt laterally about the line of contact of the lower reaction wheels with the lower track, and on tilting moves the axles of the load-bearing and upper reaction-wheel assemblies substantially horizontally and vertically relative to their respective said sleeves so that distortion of the tire means of said assemblies is minimized.

References Cited by the Examiner

UNITED STATES PATENTS

| | | | |
|---|---|---|---|
| 818,608 | 4/1906 | Brower | 104—145 |
| 923,133 | 6/1909 | Brosius | 212—22 |
| 2,162,688 | 6/1939 | Lawrence | 105—153 |
| 3,122,106 | 2/1964 | Scherer | 104—121 |

FOREIGN PATENTS 1,117,278   11/1961   Germany.

HUGO O. SCHULZ, *Primary Examiner.*

ANDRES H. NIELSEN, SAMUEL F. COLEMAN,
*Examiners.*